United States Patent
Arscott et al.

(10) Patent No.: US 9,143,178 B1
(45) Date of Patent: Sep. 22, 2015

(54) ACTIVITY-BASED REMAINING BATTERY LIFE

(75) Inventors: Simon Arscott, San Francisco, CA (US); Sameer Nanda, San Jose, CA (US)

(73) Assignee: Google Inc., Mountain View, CA (US)

( * ) Notice: Subject to any disclaimer, the term of this patent is extended or adjusted under 35 U.S.C. 154(b) by 720 days.

(21) Appl. No.: 13/425,352

(22) Filed: Mar. 20, 2012

(51) Int. Cl.
*H04M 1/00* (2006.01)
*H04B 1/38* (2015.01)
*H04M 19/08* (2006.01)

(52) U.S. Cl.
CPC . *H04B 1/38* (2013.01); *H04M 19/08* (2013.01)

(58) Field of Classification Search
CPC ..................................................... H04B 1/3883
USPC .......................... 455/573, 571, 572, 566, 575
See application file for complete search history.

(56) References Cited

U.S. PATENT DOCUMENTS

| | | | |
|---|---|---|---|
| 5,751,217 A | 5/1998 | Kchao et al. | |
| 6,087,080 A | 7/2000 | Pritchard | |
| 8,090,415 B2* | 1/2012 | Annambhotla et al. | 455/573 |
| 8,126,517 B2* | 2/2012 | Ashbrook et al. | 455/574 |
| 8,244,311 B2* | 8/2012 | Boss et al. | 455/573 |
| 2005/0076253 A1 | 4/2005 | Lu | |
| 2006/0053311 A1 | 3/2006 | Chary | |
| 2010/0145643 A1 | 6/2010 | Katpelly et al. | |
| 2011/0071780 A1 | 3/2011 | Tarkoma | |

OTHER PUBLICATIONS

Aghera, et al., "DynAHeal: Dynamic Energy Efficient Task Assignment for Wireless Healthcare Systems", Proceedings of the Conference on Design, Automation and Test in Europe, 2010, pp. 1661-1664.

* cited by examiner

*Primary Examiner* — Michael T Vu
(74) *Attorney, Agent, or Firm* — McDermott Will & Emery LLP (57) ABSTRACT

A computer-implemented method for determining activity-based battery life duration for a battery operated device, comprising: identifying, from among a plurality of tasks, one or more current tasks being performed by a user on a battery operated device, determining, from among the plurality of tasks, one or more future tasks that are likely to be performed by the user and that are different than the one or more current tasks and calculating a battery life duration for one or more of the plurality of tasks based on the one or more current tasks being performed by the user and the one or more future tasks that are likely to be performed by the user. Systems and computer-readable media are also provided.

19 Claims, 5 Drawing Sheets

ACTIVITY-BASED REMAINING BATTERY LIFE

FIELD OF THE INVENTION

The disclosed subject matter relates generally to the display of battery life indicators. More specifically, the subject technology relates to the display of battery life indicators for future tasks that are likely to be performed by a user.

BACKGROUND

In some conventional power management systems, displayed battery life indications are based on hard-coded power consumption values. Alternatively, some conventional battery life indicators are based on battery life averages for a current power usage rate. For example, the battery life indicator can provide an estimate of remaining battery life based on a measure of the current power consumption rate e.g., based on what tasks/activities the user is currently performing on the battery operated device.

SUMMARY

The disclosed subject matter relates to a computer-implemented method for determining activity-based battery life duration for a battery operated device, comprising, identifying, from among a plurality of tasks, one or more current tasks being performed by a user on a battery operated device, determining, from among the plurality of tasks, one or more future tasks that are likely to be performed by the user and that are different than the one or more current tasks and calculating a battery life duration for one or more of the plurality of tasks based on the one or more current tasks being performed by the user and the one or more future tasks that are likely to be performed by the user.

The disclosed subject matter also relates to a system for determining activity-based battery life duration for a battery operated device, the system comprising one or more processors and a computer-readable medium comprising instructions stored therein, which when executed by the processors, cause the processors to perform operations comprising: identifying, from among a plurality of tasks, one or more current tasks being performed by a user on a battery operated device determining, from among the plurality of tasks, one or more future tasks that are likely to be performed by the user and that are different than the one or more current tasks and calculating a battery life duration for one or more of the plurality of tasks based on the one or more current tasks being performed by the user and the one or more future tasks that are likely to be performed by the user. In certain aspects, the processor is further configured to perform operations for calculating a battery life duration for the battery operated device based on the one or more current tasks being performed by the user and the one or more future tasks that are likely to be performed by the user.

The disclosed subject matter also relates to a computer-readable medium comprising instructions stored therein, which when executed by a processor, cause the processor to perform operations comprising: identifying, from among a plurality of tasks, one or more current tasks being performed by a user on a battery operated device, determining, from among the plurality of tasks, one or more future tasks that are likely to be performed by the user and that are different than the one or more current tasks and calculating a battery life duration for one or more of the plurality of tasks based on the one or more current tasks being performed by the user and the one or more future tasks that are likely to be performed by the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

One limitation of conventional battery life indicators is that they fail to take into consideration what tasks are likely to be performed by a user at some future time. As such, conventional battery life indicators can fluctuate dramatically in response to changes in user behavior. These large fluctuations in the indicated battery life can cause the user to distrust the indicator accuracy.

The subject disclosure addresses this issue by providing a method and system for predicting a battery life duration based not only on tasks that the user is currently performing, but further based on tasks that the user is likely to perform in the future. In certain aspects, a battery life indication may be displayed with respect to a particular activity or task, for example, the remaining battery life duration may be provided with respect to individual tasks that are currently performed by the user and/or tasks that the user is likely to perform.

In certain implementations, the subject technology can identify (1) what tasks are being performed by the user and also (2) determine what tasks are likely to be performed by the user at some future time. The determination of future user tasks can be based on any information known about the user and/or the battery operated device. By way of example, the determination of future user tasks can be based on information pertaining the user's task history (e.g., what tasks the user has engaged in or routinely engages in), information related to the types of files stored on the battery operated device and/or information related to user communications, such as internet browsing, email or social media communications.

Subsequently, a determination of remaining battery life can be calculated based on the current and future user tasks. In some examples, the determination of remaining battery life will be based on a calculation of battery life duration with respect to one or more specific tasks. For example, the battery life duration may be calculated with respect to discrete tasks such as web browsing, music playback, video playback, etc. In certain aspects, the calculation of battery life duration for any specific task can be based on historic power consumption data for that particular task. By way of example, if it is predicted that the user will likely watch a video, the battery life duration for video playback may be calculated based on historic power consumption for video playback related events.

In some aspects, the subject disclosure provides for the display of multiple battery life indications with respect to multiple activities or tasks that the user is likely to perform in the future. For example, based on user history information, it may be determined that a user is likely to engage in a particular activity or task, such as listening to music. As such, a battery life indicator may be displayed to the user that provides an indication of an estimated battery life duration corresponding to the battery life duration that would be available for that particular task (e.g., listening to music). Multiple tasks may be displayed together, with associated battery life durations. In certain aspects, multiple user activities/tasks may be displayed to the user in an order of likelihood that the user will engage in a particular task. By way of example, if it is determined that the user is most likely to watch a movie, then a battery life indicator for video playback may be displayed at the top of an activity/task list.

Figure 1:
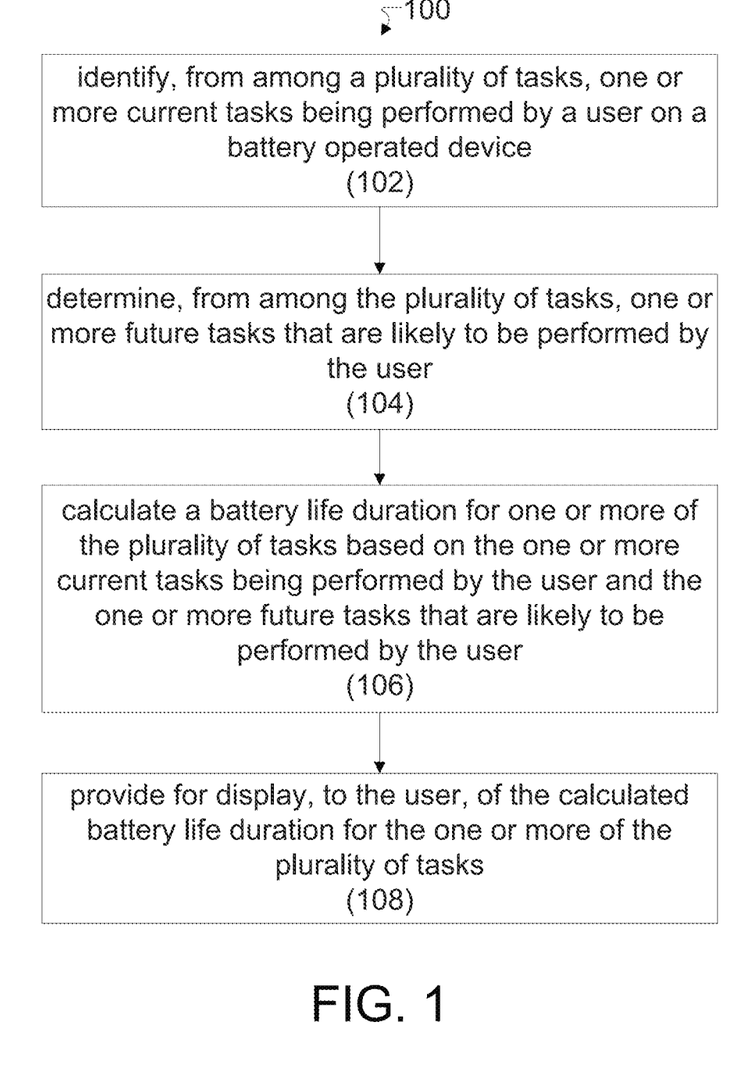
FIG. 1 illustrates a flow diagram of an example method for calculating a battery life duration, for one or more tasks according to some aspects of the subject disclosure.

FIG. 1 illustrates a flow diagram of an example method 100 for calculating a battery life duration, for one or more tasks being performed by a user on a battery operated device. As used herein, a "task" can refer to any action or behavior performed by, or on, a battery operated device. Moreover, a battery operated device can encompass any electric or electronic device that is powered, at least in part, using stored electric power (e.g., a battery). Battery powered devices can encompass, but are not limited to, wireless phones (e.g., smart phones or PDAs), mobile computing devices (e.g., laptop computers or tablet computing devices) and/or other wireless electronic devices such as cameras, digital music players (e.g., MP3 players), etc.

The method 100, begins with step 102 in which one or more current tasks being performed by a user on a battery operated device are identified. User tasks may include any task or process that is being performed or executed by the user, with respect to the battery operated device. By way of example, user tasks may include checking email, surfing the internet and/or engaging in the playback of media content, such as video or music, etc.

In step 104, one or more future tasks that are likely to be performed by the user are determined. The determination of future tasks that are likely to be performed by the user can be based on any information related to the user, the battery operated device and/or information derived from one or more different users with respect to one or more other devices. In certain implementations, the determination of future tasks may be based on task history information related to one or more tasks that have been performed by the user in the past. For example, task history information may comprise information related to power consumption characteristics for one or more tasks that have been previously performed by the user on the battery operated device. Task history information may further include information related to habits of the user, for example, the frequency with which the user performs a particular task, or the sequence in which the user performs multiple tasks, etc. In certain aspects, the determination of future tasks that are likely to be performed by the user may be based on history information pertaining to the user and/or the battery powered device. For example, history information could comprise user location history e.g., information collected from one or more global positioning system (GPS) chips, or derived from IP geo-location data. In other examples, history information may comprise information collected from one or more sensors of the battery operated device, such as, accelerometers, microphones and/or thermometers, etc.

In some implementations, task history information can comprise information related to one or more computing tasks performed by one or more other users with respect to one or more other battery operated devices. That is, task history information (including power consumption data) may be aggregated across multiple users, using different types of battery operated devices.

In step 106, a battery life duration for one or more of the plurality of tasks is calculated, based on the one or more current tasks being performed by the user and the one or more future tasks that are likely to be performed by the user. The battery life duration calculated with respect to any particular task can be used to give the user an indication of how much battery life is remaining should the user choose to engage in that particular task. By way of example, the battery life duration may be calculated with respect to video playback; thus, the calculated battery life duration would provide the user with an indication as to how long he/she would have to watch movies/play video content, etc.

The calculation of the battery life duration with respect to any particular task may be based any information related to the user, information related to the battery operated device and/or information related to one or more similar (or different) batter powered devices. For example, the calculation may take into consideration the current battery charge level and/or charge draining/loss characteristics of the battery. In some implementations, the calculation may be based, at least in part on power consumption data aggregated across multiple battery powered devices and/or multiple battery types for a variety of different tasks.

In step 108, the battery life duration calculated for the one or more of the plurality of tasks is provided for display to the user. In some examples, the display may be provided on a display device of the battery powered device. In other implementations, the calculated battery life duration may be provided for a display that is physically separate, but communicatively connected to the battery operated device.

In some implementations, a ranking of future tasks that are likely to be performed by the user may be determined (e.g., based on a relative likelihood that the user will perform each of the two or more future tasks) and the user provided with a display of the ranked tasks. For example, the user may be provided with a display of a plurality of tasks, each accompanied by an indication of the remaining battery life for that task, wherein the tasks are ranked in an order of likelihood of user engagement.

Figure 2:
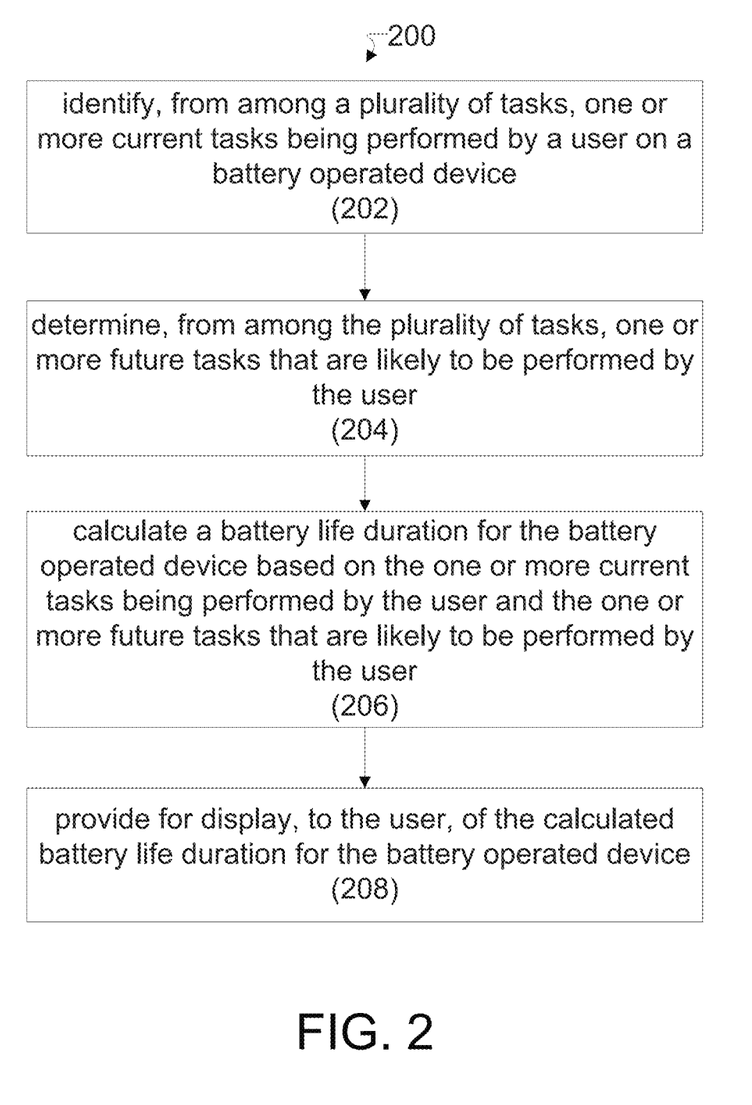
FIG. 2 illustrates a flow diagram of an example method for calculating a battery life duration for a battery operated device, according to some aspects of the subject disclosure.

FIG. 2 illustrates a flow diagram of an example method 200 for calculating a battery life duration for a battery operated device, according to some aspects of the subject disclosure. The method 200 begins with step 202 in which one or more current tasks being performed by a user on a battery operated device are identified. As discussed above with respect to step 102, tasks can encompass any task or process that is being performed or executed by the user, with respect to the battery operated device. By way of example, if a user is engaged in checking email and conducting an IP telephone call with another user via a network (e.g., the internet), the current identified tasks may include email and IP telephone.

In step 204, one or more future tasks that are likely to be performed by the user are determined. As discussed above with respect to step 104, the determination of future tasks that are likely to be performed by the user can be based on any information related to the user, the battery operated device and/or information derived from one or more different users with respect to other devices. In some implementations, the determination or prediction of what future tasks the user is likely to engage in may be based on a variety of information comprising: what tasks the user is currently engaged in, information related to user communication (e.g., user communication information) with other users and/or the types of information stored by the user on the battery powered device, etc.

By way of example, a storage device connected to the battery operated device may comprise a relatively large number of music files. As such, upon connection with the storage device, it may be determined that the user is likely to engage in the playback of one or more music files. In another example, the user may initiate a search for a particular type of content; accordingly, based on the user's web search (and/or the user's web search history), it may be determined that the user is likely to want to play video content on the battery operated device.

In step 206, a battery life duration for the battery operated device is calculated based on the one or more current tasks being performed by the user and the one or more future tasks that are likely to be performed by the user, as discussed above with respect to steps 202 and 204. Although the calculation of the battery life duration may be based on the current user tasks, as well as those tasks which the user is likely to perform in the future, the calculation is not limited to these types of information. For example, the calculation of battery life duration for the battery operated device may be based on characteristics of the battery operated device (e.g., current charge retention characteristics of the battery and/or information pertaining to the power consumption of one or more hardware devices or components of the battery operated device).

In step 208, a display of the calculated battery life duration for the battery operated device is provided for display to the user. By displaying the calculated battery life duration for the battery operated device based not only on current user activities, but also based on what actions the user is likely to perform/want to perform, the user may be provided with a more accurate estimate of the actual life of the battery operated device.

Figure 3:
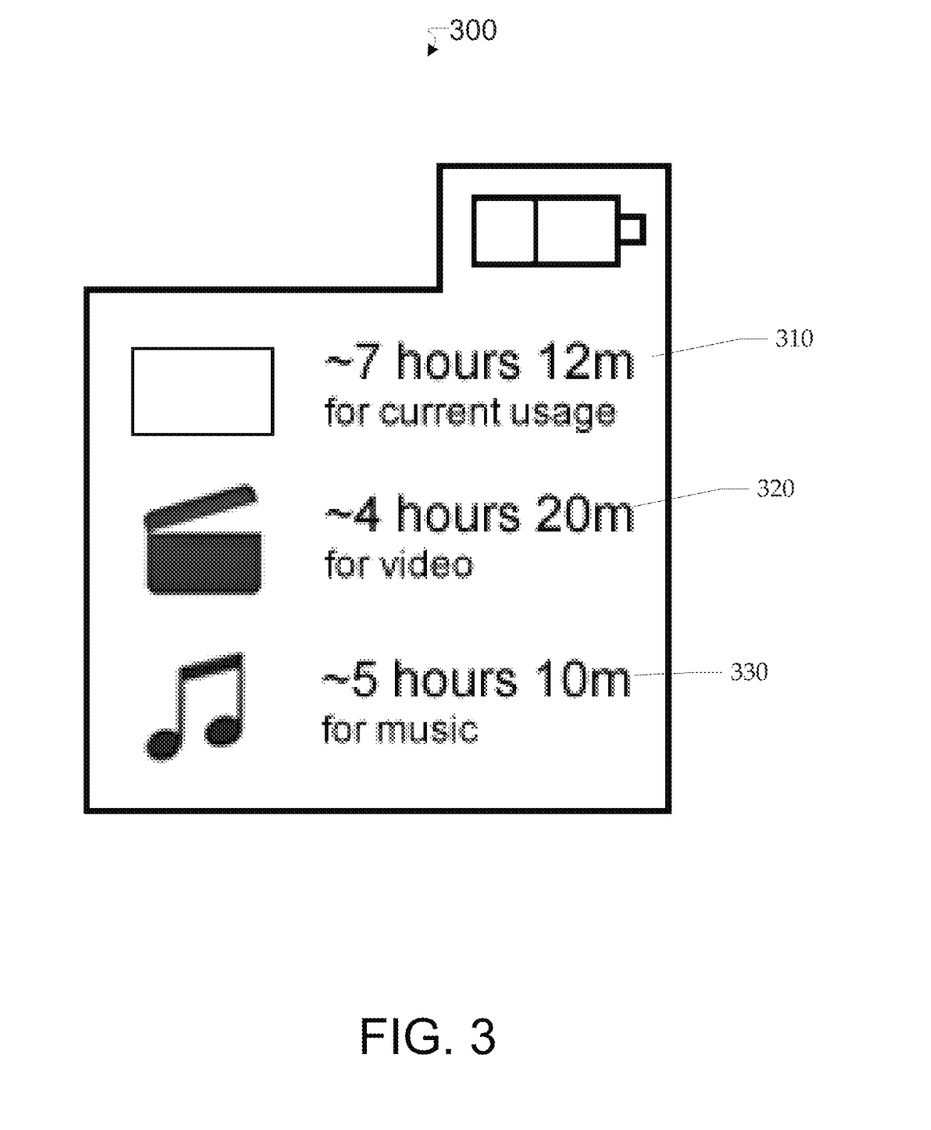
FIG. 3 illustrates an example of a display of remaining battery life, according to some aspects of the subject disclosure.

FIG. 3 illustrates an example of a display 300 of remaining battery life, according to some aspects of the subject disclosure. Specifically, the example display of FIG. 3 illustrates an estimated battery life for a total usage time 310 of a battery operated device (e.g., approximately 7 hours and 12 minutes), as well as approximate battery life durations for video playback 320 and music playback 330. Although, the display of FIG. 3 illustrates 3 total items, a greater number, or lesser number of items/tasks may be displayed, depending on user preference and/or device settings.

As discussed above with respect to the method 100, the order of tasks or items provided for display to the user may be based on a relative likelihood that the user will engage in a particular task. In some implementations, tasks in which the user is currently engaged may be ranked higher in the provided display. By way of example, in the example display of FIG. 3, the user may be currently engaged in watching a video and may be likely to listen to music at some time in the future. Accordingly, an indication of battery life duration with respect to video playback 320 may be provided with a higher rank in the display 300, of FIG. 3.

Figure 4:
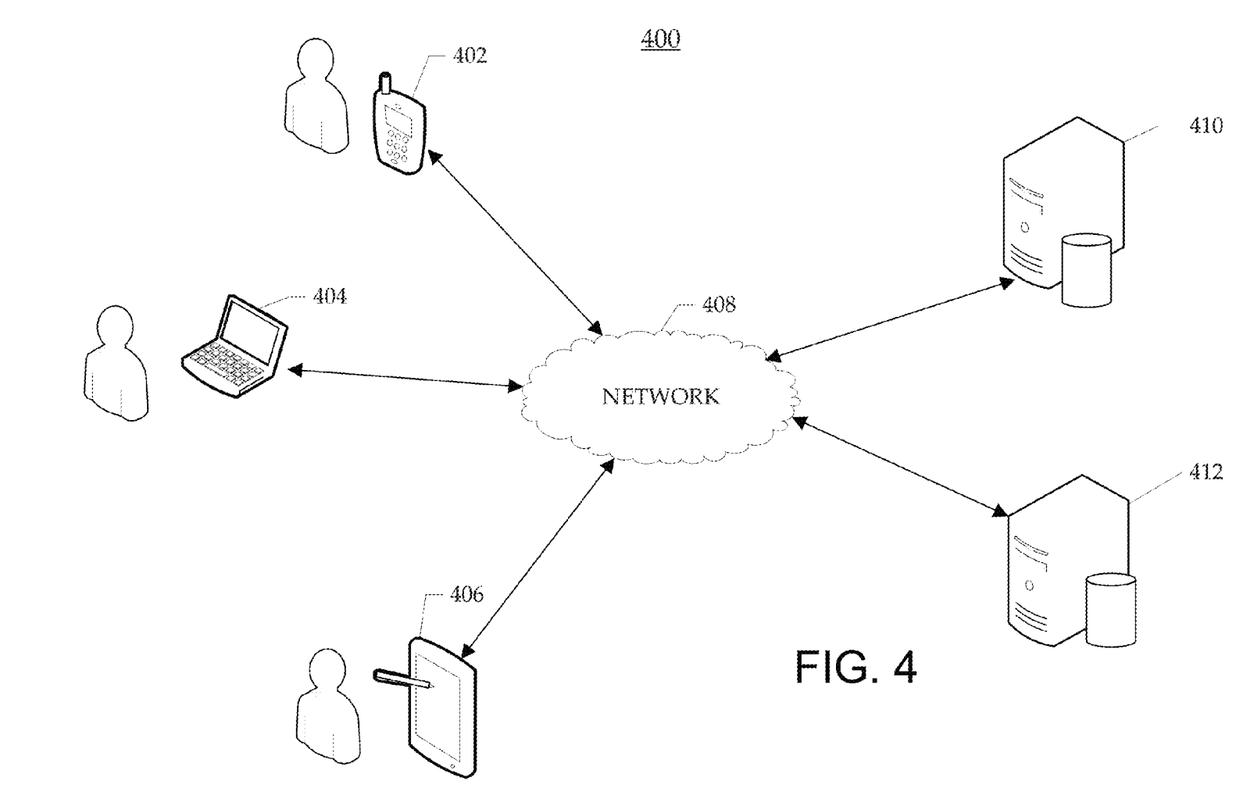
FIG. 4 illustrates an example network system that can be used to implement some aspects of the subject technology.

FIG. 4 illustrates an example network system 400 that can be used to implement some aspects of the subject technology. Specifically, the network system 400 comprises multiple battery operated devices (e.g., user devices 402, 404 and 406). As illustrated, the network system 400 also includes a first server 410, a second server 412 and a network 408. The user devices 402, 404 and 406 are communicatively connected to the first server 410 and the second server 412, via the network 408. It is understood that in addition to the user devices 402, 404 and 406, and the first server 410 and the second server 412, any number of other processor-based devices could be communicatively connected to the network 408. Furthermore, as will be discussed in greater detail below, the network 408 could comprise multiple networks, such as a network of networks, e.g., the Internet.

In some examples, one or more of the process steps of the subject technology can be carried out by one or more of the battery operated user devices 402, 404 and 406 and/or the first server 410 and the second server 412, over the network 408. By way of example, battery operated user device 404 may receive user history information, task history information and/or user communication information from one or more of the first server 410 and/or the second server 412, via the network 408. By way of example, task history information may be aggregated from the users of user devices 402 and 406, and used to provide the user of user device 404 with an indication of remaining battery life duration, with respect to one or more tasks performed on the user device 404.

Figure 5:
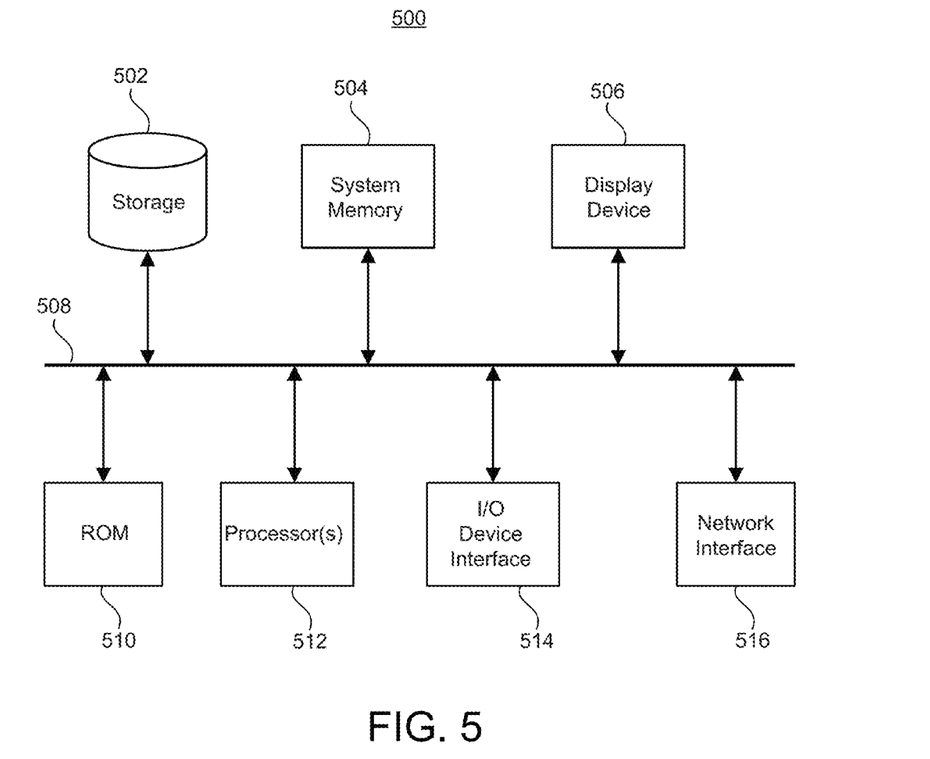
FIG. 5 illustrates an example of an electronic system with which some aspects of the subject technology can be implemented.

FIG. 5 illustrates an example of an electronic system that can be used for executing the steps of the subject disclosure. In some examples, the electronic system 500 can be a single computing device such as a server (e.g., the first server 410 and/or the second server 412, discussed above). Furthermore, in some implementations, the electronic system 500 can be operated alone or together with one or more other electronic systems e.g., as part of a cluster or a network of computers.

As illustrated, the processor-based system 500 comprises storage 502, a system memory 504, an output device interface 506, system bus 508, ROM 510, one or more processor(s) 512, input device interface 514 and a network interface 516. In some aspects, the system bus 508 collectively represents all system, peripheral, and chipset buses that communicatively connect the numerous internal devices of the processor-based system 500. For instance, system bus 508 communicatively connects the processor(s) 512 with the ROM 510, the system memory 504, the output device interface 506 and the permanent storage device 502.

In some implementations, the various memory units, the processor(s) 512 retrieve instructions to execute (and data to process) in order to execute the steps of the subject technology. The processor(s) 512 can be a single processor or a multi-core processor in different implementations. Additionally, the processor(s) can comprise one or more graphics processing units (GPUs) and/or one or more decoders, depending on implementation.

The ROM 510 stores static data and instructions that are needed by the processor(s) 512 and other modules of the processor-based system 500. Similarly, the processor(s) 512 can comprise one or more memory locations such as a CPU cache or processor in memory (PIM), etc. The storage device 502, is a read-and-write memory device. In some aspects, this device can be a non-volatile memory unit that stores instructions and data even when the processor-based system 500 is without power. Some implementations of the subject disclosure can use a mass-storage device (such as solid state, magnetic or optical storage devices) e.g., a permanent storage device 502.

Other implementations can use one or more a removable storage devices (e.g., magnetic or solid state drives) such as permanent storage device 502. Although the system memory can be either volatile or non-volatile, in some examples the system memory 504 is a volatile read-and-write memory, such as a random access memory. System memory 504 can store some of the instructions and data that the processor needs at runtime.

In some implementations, the processes of the subject disclosure are stored in system memory 504, permanent storage device 502, ROM 510 and/or one or more memory locations embedded with the processor(s) 512. From these various memory units, processor(s) 512 retrieve instructions to execute and data to process in order to execute the processes of some implementations of the instant disclosure.

The bus 508 also connects to the input device interface 514 and output device interface 506. The input device interface 514 enables a user to communicate information and select commands to the processor-based system 500. Input devices used with the input device interface 514 may include for example, alphanumeric keyboards and pointing devices (also called "cursor control devices") and/or wireless devices such as wireless keyboards, wireless pointing devices, etc.

Finally, as shown in FIG. 5, bus 508 also communicatively couples the processor-based system 500 to a network (not shown) through a network interface 516. It should be understood that the network interface 516 can be either wired, optical or wireless and may comprise one or more antennas and transceivers. In this manner, the processor-based system 500 can be a part of a network of computers, such as a local area network ("LAN"), a wide area network ("WAN"), or a network of networks, such as the Internet (e.g., the network 410, as discussed above).

In practice the methods of the subject technology can be carried out by the processor-based system 500. In some aspects, instructions for performing one or more of the method steps of the present disclosure will be stored on one or more memory devices such as the storage 502 and/or the system memory 504.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method for determining activity-based battery life duration for a battery operated device, comprising:
   identifying, from among a plurality of tasks, one or more current tasks being performed by a user on a battery operated device;
   determining, from among the plurality of tasks, one or more future tasks that are likely to be performed by the user and that are different than the one or more current tasks, wherein the determining the one or more future tasks likely to be performed by the user is based on the one or more current tasks being performed by the user on the battery operated device;
   calculating a battery life duration of the battery operated device for the one or more current tasks being performed by the user;
   calculating a battery life duration of the battery operated device for each of the one or more future tasks that are likely to be performed by the user;
   providing the calculated battery life duration of the battery operated device for the one or more current tasks for display to the user; and
   providing the calculated battery life duration of the battery operated device for at least one of the future tasks for display to the user.

2. The method of claim 1, further comprising:
   calculating a battery life duration for the battery operated device based on the one or more current tasks being performed by the user and the one or more future tasks that are likely to be performed by the user.

3. The method of claim 2, further comprising:
   providing for display to the user, the calculated battery life duration for the battery operated device.

4. The method of claim 1, further comprising:
   determining a ranking of two or more future tasks that are likely to be performed by the user, based on a relative likelihood that the user will perform each of the two or more future tasks; and
   providing for display, to the user, of the two or more future tasks based on the determined ranking of the two or more future tasks.

5. The method of claim 1, wherein the determining the one or more future tasks likely to be performed by the user is based on task history information associated with the user.

6. The method of claim 1, wherein the determining the one or more future tasks likely to be performed by the user is based on task history information associated with a plurality of users.

7. The method of claim 1, wherein the determining the one or more future tasks likely to be performed by the user is based on user communication information associated with the user.

8. The method of claim 1, wherein the determining the one or more future tasks likely to be performed by the user is based on location history information associated with the user.

9. The method of claim 1, wherein the determining the one or more future tasks likely to be performed by the user is based on history information collected from one or more sensors of the battery operated device.

10. A system for determining activity-based battery life duration for a battery operated device, the system comprising:
    one or more processors; and
    a non-transitory computer-readable medium comprising instructions stored therein, which when executed by the processors, cause the processors to perform operations comprising:
      identifying, from among a plurality of tasks, one or more current tasks being performed by a user on a battery operated device;
      determining, from among the plurality of tasks, one or more future tasks that are likely to be performed by the user and that are different than the one or more current tasks, wherein the determining the one or more future tasks likely to be performed by the user is based on the one or more current tasks being performed by the user on the battery operated device;
      calculating a battery life duration for the battery operated device for the one or more current tasks being performed by the user;
      calculating a battery life duration for the battery operated device for each of the one or more future tasks that are likely to be performed by the user;
      providing the calculated battery life duration of the battery operated device for the one or more current tasks for display to the user; and
      providing the calculated battery life duration of the battery operated device for at least one of the future tasks for display to the user.

11. The system of claim 10, the operations further comprising:

providing for display, to the user, of the calculated battery life duration for the battery operated device.

12. The system of claim 10, the operations further comprising:
  determining a ranking of two or more future tasks that are likely to be performed by the user, based on a relative likelihood that the user will perform each of the two or more future tasks; and
  providing for display, to the user, of the two or more future tasks based on the determined ranking of the two or more future tasks.

13. The system of claim 10, wherein the determining the one or more future tasks likely to be performed by the user is based on task history information associated with the user.

14. The system of claim 10, wherein the determining the one or more future tasks likely to be performed by the user is based on task history information associated with the user.

15. The system of claim 10, wherein the determining the one or more future tasks likely to be performed by the user is based on user communication information associated with a plurality of users.

16. A non-transitory computer-readable medium comprising instructions stored thereon, which when executed by a processor, cause the processor to perform operations comprising:
  identifying, from among a plurality of tasks, one or more current tasks being performed by a user on a battery operated device;
  determining, from among the plurality of tasks, one or more future tasks that are likely to be performed by the user and that are different than the one or more current tasks, wherein the determining the one or more future tasks likely to be performed by the user is based on the one or more current tasks being performed by the user on the battery operated device;
  calculating a battery life duration of the battery operated device for the one or more current tasks being performed by the user;
  calculating a battery life duration of the battery operated device for each of the one or more future tasks that are likely to be performed by the user;
  providing the calculated battery life duration of the battery operated device for the one or more current tasks for display to the user; and
  providing the calculated battery life duration of the battery operated device for at least one of the future tasks for display to the user.

17. The non-transitory computer-readable medium of claim 16, further comprising:
  calculating a battery life duration for the battery operated device based on the one or more current tasks being performed by the user and the one or more future tasks that are likely to be performed by the user.

18. The non-transitory computer-readable medium of claim 17, further comprising:
  providing for display to the user, the calculated battery life duration for the battery operated device.

19. The non-transitory computer-readable medium of claim 16, further comprising:
  determining a ranking of two or more future tasks that are likely to be performed by the user, based on a relative likelihood that the user will perform each of the two or more future tasks; and
  providing for display, to the user, of the two or more future tasks based on the determined ranking of the two or more future tasks.

* * * * *